United States Patent [19]

Scarpa et al.

[11] 4,261,456
[45] Apr. 14, 1981

[54] METHOD AND APPARATUS FOR TRANSFERRING TUBES INTO CARTONER PRODUCT BUCKETS

[75] Inventors: Eric W. Scarpa, Cincinnati, Ohio; Wesley J. Rece, California, Ky.

[73] Assignee: R. A. Jones & Co. Inc., Covington, Ky.

[21] Appl. No.: 52,492

[22] Filed: Jun. 27, 1979

[51] Int. Cl.³ .............................................. B65G 47/26
[52] U.S. Cl. .................................... 198/460; 198/466; 198/491; 198/796
[58] Field of Search ......................... 198/460, 465–467, 198/482, 491, 492, 450, 451, 481, 796, 531, 532

[56] References Cited

U.S. PATENT DOCUMENTS

| 334,274 | 1/1886 | Norton | 198/481 |
|---|---|---|---|
| 2,756,862 | 7/1956 | Creed | 198/481 |
| 2,813,615 | 11/1957 | Klein | 198/492 |
| 3,565,232 | 2/1971 | Cadwallader | 198/481 |
| 3,628,646 | 12/1971 | Schuster et al. | 198/460 |
| 3,921,786 | 11/1975 | Hejmanowski | 198/367 |
| 4,215,774 | 8/1980 | Manservisi | 198/450 |

FOREIGN PATENT DOCUMENTS 2630438  4/1978  Fed. Rep. of Germany ........... 198/492

Primary Examiner—Joseph E. Valenza
Attorney, Agent, or Firm—Wood, Herron & Evans

[57] ABSTRACT

Method and apparatus for transferring tubes such as metallic tooth paste tubes from a tube filler to product buckets of a cartoner. Tubes are delivered by a conveyor to a tube filler onto the circumferential surface of a rotary drum which has at least one pocket in its surface. The pocket picks up the tube deposited on the surface of the drum and drops the tube into continuously-moving product buckets below the drum. Three gates are spaced along the conveyor to maintain a proper spacing of the tubes so that the tubes do not bang into one another and so that only one at a time is deposited onto the circumferential surface of the drum.

16 Claims, 7 Drawing Figures

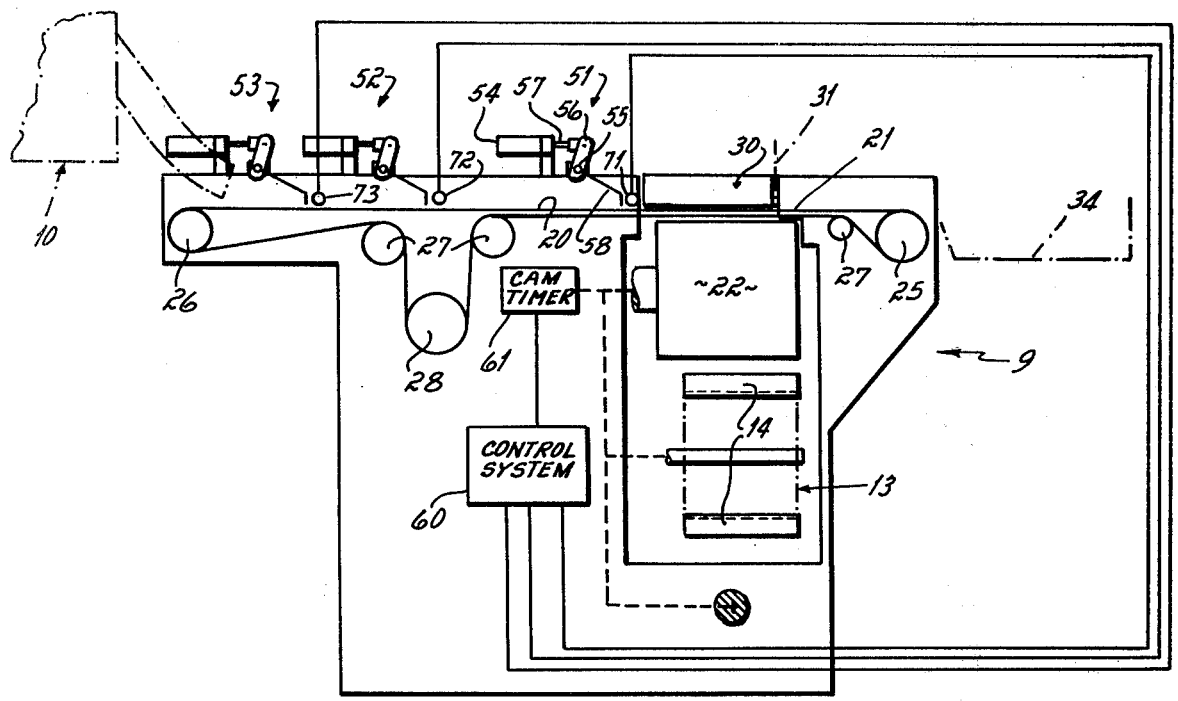
Fig. 1
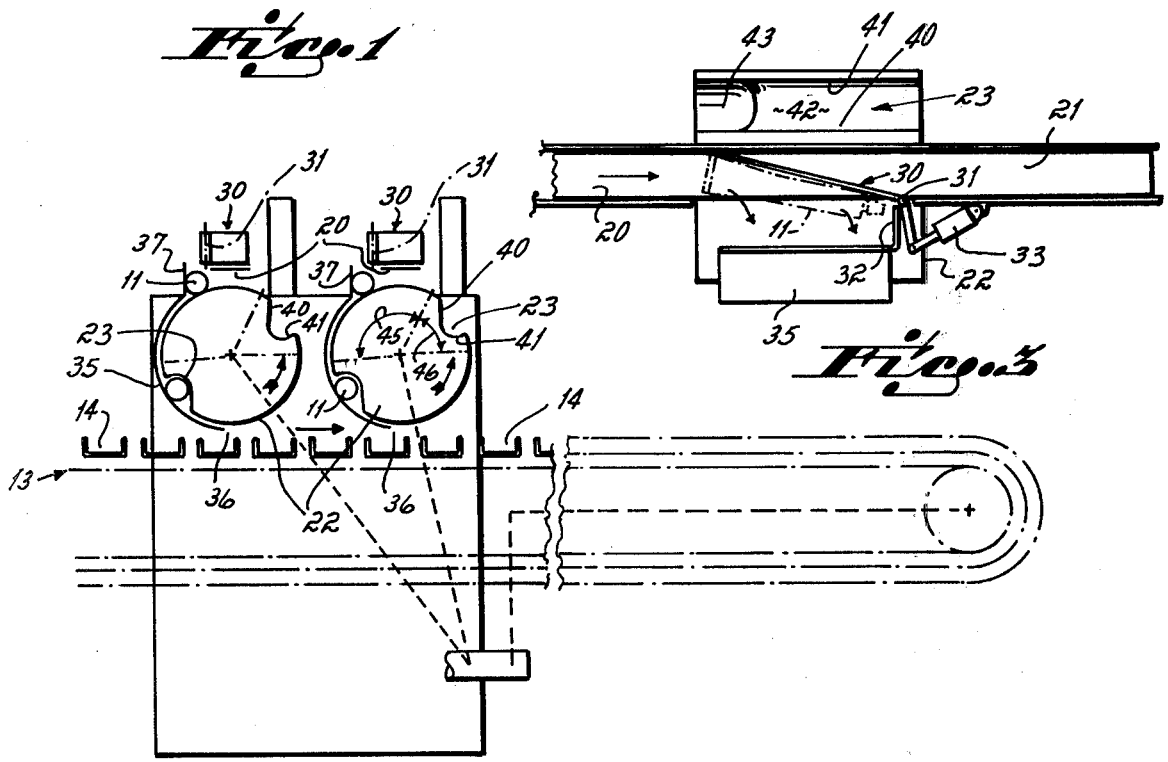
Fig. 2
Fig. 3

METHOD AND APPARATUS FOR TRANSFERRING TUBES INTO CARTONER PRODUCT BUCKETS

This invention relates to apparatus for transferring tubes from a tube filler to product buckets as a cartoner.

The problem of a tube transfer mechanism of the type to which the present invention is directed is that of timing the tubes into continuously and rapidly moving product buckets of the cartoner. One approach to this problem has been to tie the tube filler mechanically to the cartoner so that both are driven from the same power source. This solution to the problem gives rise to other problems, particularly including the periodically extremely high power requirements for the tube filler which tends to lift the cartoner off its base at each cycle and is very hard on the cartoner.

Another approach has been to provide a random feed of tubes not timed to the cartoner speed but approximating it. A plurality of tubes are accumulated in end-to-end relation and are fed into product buckets by a check and release gate type mechanism which is timed to the cartoner. While this mechanism can satisfactorily transfer tubes to the cartoner, the end-to-end contact of the tubes with each other tends to produce a slight buckling of the clip and of the tube, making the tube somewhat unsightly and resulting in customer dissatisfaction.

An objective of the present invention has been to provide a tube transfer apparatus for receiving tubes at random feed and depositing them in timed relation into product buckets without requiring accumulation and check and release. It is contemplated, for example, that the cartoner would run approximately 2 to 5% faster than the tube filler so that there would never be an accumulation of tubes, but there would be an occasional empty product bucket.

This objective in part is achieved by providing a rotating transfer drum having a substantial circumferential surface interrupted by one pocket per cycle of the machine. A conveyor from the tube filler delivers tubes onto the circumferential surface spaced from the pocket. The tubes are blocked from rotation with the drum by a shroud surrounding a portion of the drum. When the pocket is rotated underneath the tube blocked by the shroud, the tube drops into the pocket and is carried by the drum to the lower side of the drum where it passes beyond the shroud and into a product bucket passing below.

A gate is provided at the discharge end of the conveyor to permit a tube to be discharged onto the drum only when the tube is assured of alighting on the circumferential surface and to block movement of the tube when there is a chance that the tube would be dropped onto the drum when a pocket is present such as would cause jamming of the tube between the pocket and the shroud, for example. The combined gate and drum permits a tube to be discharged from the conveyor at any time during approximately 270° of a cycle, thereby greatly reducing the criticality of the timing of the discharge from the conveyor.

The gating system by which the discharge of the tubes is timed constitutes another important feature of the invention.

A primary gate, referred to above, at the discharge end of the conveyor is timed to the drum and cartoner to be opened only when a safe area of the drum is present and to be closed when the pocket or unsafe portion of the drum is present. Additionally, an electric eye, detecting the passage of a tube through the gate, operates to close the gate immediately following the passage of a tube through the gate. Once closed, the gate will remain closed until opened by the machine at the beginning of another subsequent cycle. Thus, there are two functions of the primary gate, namely, to deliver a tube during the safe portion of the drum rotation and to deliver only one tube during a cycle.

A secondary gate is spaced upstream from the primary gate to provide additional assurance that only one tube at a time will be fed onto the drum. The upstream secondary gate normally remains closed and opens only when a tube has passed the primary gate. The secondary gate is thereafter closed as soon as a tube passes it. Thus, the secondary gate provides assurance that only one tube at a time is present in the space between the secondary and primary gate.

Then to provide still further assurance of only one tube at a time passing through the primary gate, a third gate is spaced upstream from the secondary gate with controls to open it only when a tube has passed the secondary gate and to close it as soon as a tube has passed the third gate.

Another feature of the invention is found in the diverter gate at the discharge end of the conveyor. The diverter gate, downstream from the primary gate, provides an angulated surface overlying the conveyor at a location adjacent the drum. A tube moving in a longitudinal direction by the conveyor is cammed off the conveyor by the engagement of the tube with the angulated surface of the gate and is thus gently deposited on the drum surface. The diverter gate is capable of being swung to an inoperative position which would permit tubes to pass beyond the drum to an accumulating station so that if the cartoner must be stopped, the tubes from the filler can be diverted from the cartoner mechanism.

Another feature of the invention resides in the drum pocket and shroud relationship. The shroud preferably presents a barrier to rotation of the tube at a location at one side of the top of the drum. This is the point at which the tube drops into the pocket of the drum and, if located to one side of the top, permits a more gradual entry of the tube into the pocket.

The leading surface of the pocket is more gradually sloped than the trailing surface so as to further provide for the gentle entry of the tube into the pocket.

The depth of the pocket is approximately one-half the diameter of the tube and the shroud is passed from the surface of the drum approximately one-half the diameter of the tube so as to reduce the distance the tube has to drop into and out of the pocket during each cycle of operation.

The pocket of the drum also has an enlarged end for the tube clip so that the outer surface of the tube deposited in the pocket is substantially uniformly spaced from the circumferential surface of the drum.

Another feature of the invention is to provide a linear or circumferential speed of the drum which is slightly faster (25%) than the product buckets below so as to provide extra circumferential surface on the drum to receive the tube.

The several features and objectives of the invention will become more readily apparent from the following detailed description taken in conjunction with the accompanying drawings in which:

FIG. 1 is a diagrammatic side elevational view of the apparatus;

FIG. 2 is a diagrammatic end elevational view of the apparatus;

FIG. 3 is a top plan view of the diverter gate forming a part of the apparatus;

Figure 4:
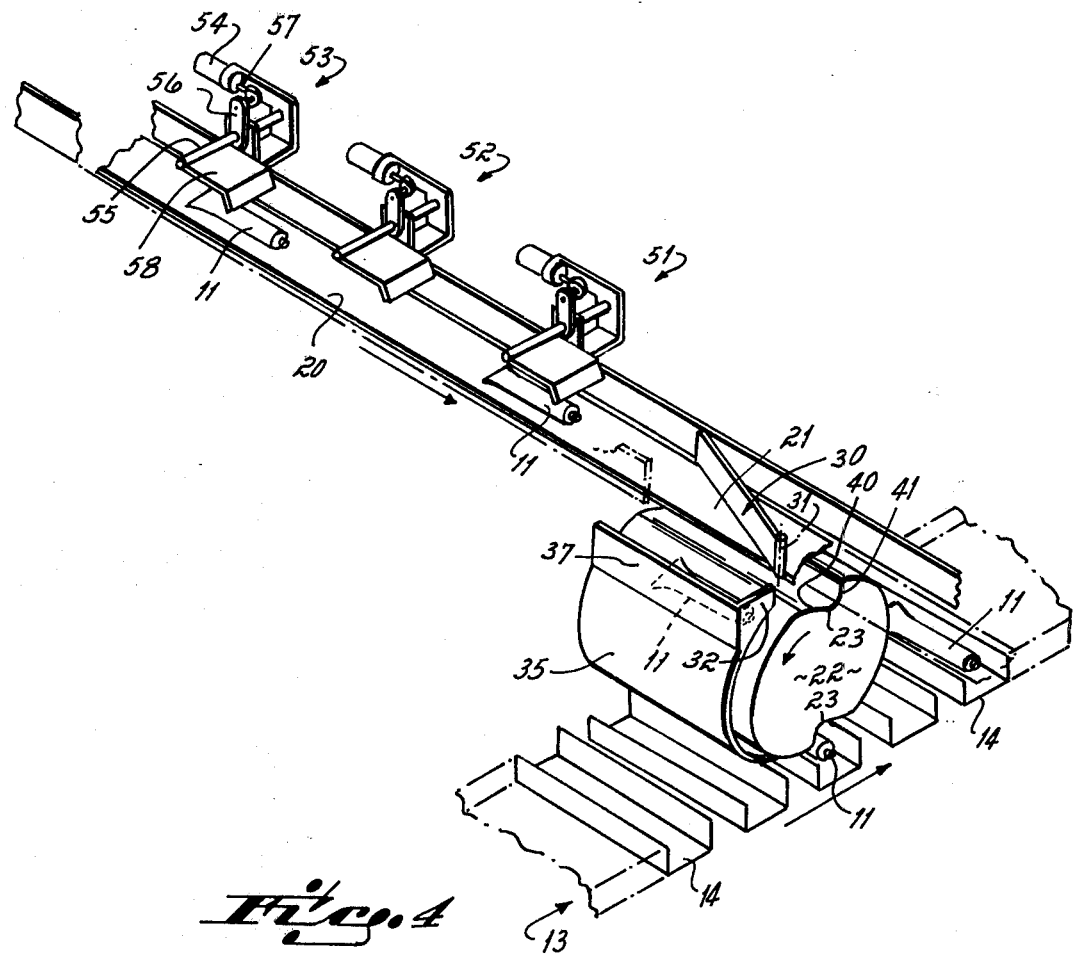
FIG. 4 is a diagrammatic perspective view of the apparatus with the tubes in the relationship of line T in FIG. 6.

In the apparatus of the invention, it is contemplated that one tube filler supplying 180 tubes per minute will utilize two parallel transfer mechanisms including two tube transfer drums to deposit tubes into the product buckets. Thus, 90 tubes per lane will be supplied to the tube transfer with each lane filling alternate buckets. It should be understood that other arrangements of tube fillers and transfer mechanisms may be employed depending upon customer requirements. For example, four lanes feeding the product buckets could be supplied with tubes from two tube fillers.

It is contemplated that the cartoner will run from 2-5% faster than the tube filler.

The apparatus indicated at 9 includes a tube filler 10 feeding tubes 11 into a cartoner 12 (not shown) having an endless conveyor 13 for product buckets 14. The tubes 11 from the filler 10 are deposited on an endless belt conveyor 20 whose upper flight moves toward the right in FIG. 1. The conveyor 20 has a discharge end 21 overlying a rotary drum 22. The drum is illustrated as being cylindrical but may be frusto conical. The drum 22 is driven by the bucket conveyor 13 and is timed to it, as diagrammatically shown by the broken lines in FIG. 1. Each drum has two pockets 23 which are adapted to receive and drop tubes into the product buckets, the pockets 23 being timed to pass over their respective product buckets as the product buckets move underneath past the transfer mechanism. The belt conveyor 20 passes around a pulley 25 at its discharge end and a pulley 26 at its upstream end. The belt also passes over idler pulleys 27 and a drive pulley 28. The belt is driven separately from the cartoner so as to provide a tube pitch of approximately 30 inches.

A diverter gate 30 is pivotally mounted on a vertical axis 31 at the discharge end of the belt conveyor 20. The gate has a pneumatic actuator 33 which, under certain emergency situations, swings out of the path of the belt to permit tubes to pass beyond the drum and into a reject container 34. The diverter gate 30 overlies the drum 22 and is angulated with respect to the direction of movement of the belt 20 so as to cause tubes to be cammed off of the belt and onto the drum as they reach the discharge end of the belt. A stop 32 is provided to be engaged by the cap end of the tube as it slides off the conveyor belt 20.

A shroud 35 surrounds about 150° of the circumference of the drum, the shroud having a lower discharge end 36 at approximately the lowermost portion of the drum. The shroud has a barrier 37 at the upper end of the shroud which is engaged by a tube deposited on the drum and which holds or detains the tube in position until a pocket 23 passes underneath the tube. The shroud is radially spaced from the circumference of the drum about one-half a tube diameter. The depth of each pocket 23 is about one-half a tube diameter so that the tube does not have far to drop into the pocket, nor does it have far to drop out of the pocket when being released into a product bucket.

Each pocket 23 has a gradually-sloped leading surface 40 and a more abruptly sloped trailing surface 41. The gradual slope on the leading surface 40 is provided in order for the tube to be deposited in the pocket as gently as possible. Further, the position on the drum at which the tube drops in the pocket is located slightly (about 30°) downstream of the top of the drum so that the tube is not required to drop vertically into the drum at the top but rather has a more gradual entry into the pocket.

Figure 5A:
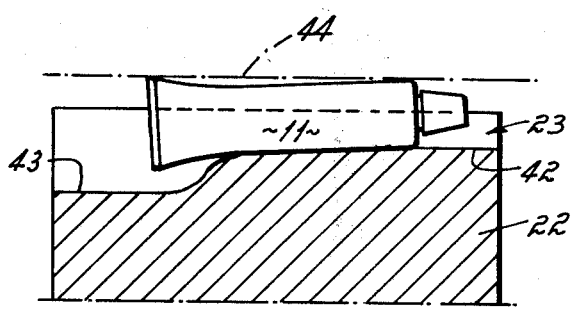
FIG. 5A is a cross-sectional view of a top part of the drum to illustrate the pocket configuration.
Figure 5B:
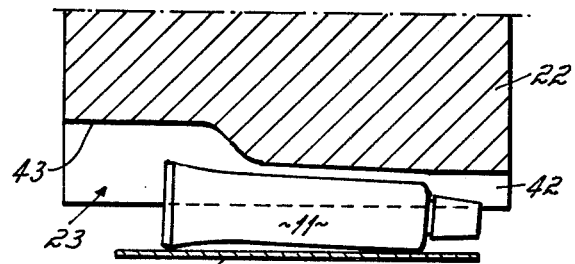
FIG. 5B is a cross-sectional view of a lower portion of the drum and shroud to show the spatial relationship of the tube to the drum and shroud.

The pocket is preferably configured as shown at 42 in FIGS. 5A and 5B to provide an enlarged area at 43 for the clip end of the tube. The pocket configuration is such as to maintain the tube's extremities parallel to the axis of the drum as shown by the phantom line 44 in FIG. 5A.

With two pockets in the drum, each cycle of depositing a tube in a product bucket is completed in a half revolution of the drum. Calling each cycle 360°, the drum is in position to receive a tube during approximately 270° of each cycle. In a general sense, the circumference of the drum can be divided into a safe area of about 270° indicated at 45 and an unsafe area of about 90° indicated at 46. A tube deposited onto the safe area rests against the barrier 37 until the pocket 23 rotates underneath the tube whereby the tube slides into the pocket and is thereafter carried around for deposit into a product bucket. If the tube were discharged when onto the unsafe area, there is a possibility of the tube being jammed between the pocket and the shroud with the probable rupture of the tube and the spreading of its contents onto the drum.

To discharge the tube onto the drum at the proper time, three gates 51–53 are provided. All gates are operated by double-acting pneumatic piston and cylinders 54. Each gate is pivoted at 55 and has a lever arm 56 connected to a piston rod 57 of the piston and cylinder 54. A gate arm 58 is fixed to the lever arm 56 and is positioned over the belt conveyor 20 so as to be swung either into or out of the path of a tube riding on the conveyor. The gates are operated by a control system 60 which has two primary inputs. A cam timer 61 is directly driven by the cartoner drive in timed relation to the drum. Additionally, electric eyes 71, 72 and 73 are associated with gates 51, 52 and 53, respectively, and are located immediately downstream of each gate arm 58.

The primary gate 51 is controlled in part by the cam timer 61 and in part by the electric eye 71. The cam timer controls the piston and cylinder to open the gate as soon as the pocket has passed the discharge point so as to present safe area on the drum for receipt of a tube. The timer also operates to close the gate when the pocket is approaching the discharge position for the tube so as to preclude the discharge of a tube onto the pocket.

The electric eye 71 acts to close the gate as soon as a tube has passed the electric eye. The gate will thereafter remain closed until the cam timer opens it at the beginning of the cycle. The primary gate and its associated controls therefore permit a tube to be discharged onto a safe area only of the drum and immediately block the introduction of more than one tube during any one cycle.

The secondary gate 52 is controlled by the electric eye 72 associated with it as well as the electric eye 71 associated with the primary gate. When a tube passes the primary gate 51, its electric eye 71 triggers the opening of the secondary gate 52. In a sense, the electric eye of the primary gate is telling the secondary gate that the primary gate has released its tube and is ready for another tube. The electric eye 72 associated with the secondary gate 52 closes the secondary gate as soon as a tube has passed the secondary gate. Thus, if two tubes are following closely upon one another, the upstream tube will be blocked after the downstream tube has been released.

Finally, a third gate 53 is located upstream of the secondary gate 52. The electric eye 72 associated with the secondary gate triggers the opening of the third gate 53 and the electric eye 73 associated with the third gate triggers the closing of the third gate as soon as a tube has passed. The gates are preferably spaced apart about twice a tube length. For example, when the tube pitch is 30 inches and the tube length is approximately 9 inches, an 18-inch spacing between gates works satisfactorily.

In timing the opening and closing of the primary gate 51, allowance must be made for the travel time of the tube passing through the primary gate by the diverter gate and onto the drum.

Further, the primary gate must always be down when a tube would be discharged into the unsafe area and preferably a little ahead of it as, for example, one tube length. This provides a little margin of error for the tube which might bounce about slightly when it is discharged from the conveyor belt.

The revolutions per minute of the drum are, of course, timed to the cartoner. The diameter of the drum, however, can be increased, within limits, and it is desirable to have a fairly large diameter in order to create the maximum safe area for discharge of the tube onto the drum surface.

The belt conveyor 20 is run independently of the filler and cartoner. It is desirable to keep the speed low in order to keep the tubes from banging into the gates and onto the drum. On the other hand, it is desirable to keep the speed high in order to maintain the spacing between incoming tubes as large as possible. Running the belt fast enough to maintain a tube pitch of approximately 30 inches works satisfactorily when each transfer mechanism is handling about 90 tubes per minute.

OPERATION

To start the apparatus, let it be assumed that there is a tube at each gate. First, start the belt 20.

Second, start the cartoning machine and ignore the first and second signals from the cam timer on the primary gate. This will provide assurance that any tubes in the drum are deposited into the product buckets thereby cleaning out the drum.

Start operating the primary gate 51, then the other gates will clean out through the logic which has been described above. Finally, start the tube filler.

If there is an emergency stop because the cartoner has stopped, the apparatus may be programmed to stop the tube filler and permit the belts to run for three or four seconds with all of the gates staying down. When it is thereafter decided to start up the machine, following the start-up procedures outlined above will provide the proper sequence.

An alternative option for an emergency stop involves the operation of the diverter gate to cause the tubes to bypass the cartoner with all of the gates being up permanently until the apparatus is back in operation. When the apparatus is back in operation, the cartoner should be gotten up to speed with the diverter still operating. Thereafter, start operating the primary gate and then all other gates. At this point, the diverter can then be operated to divert tubes onto the transfer drum.

If for some reason the tube filler does not operate properly, the operator can flip the diverter switch and the improperly filled tubes can go to scrap until the problem in the tube filler has been corrected.

Figure 6:
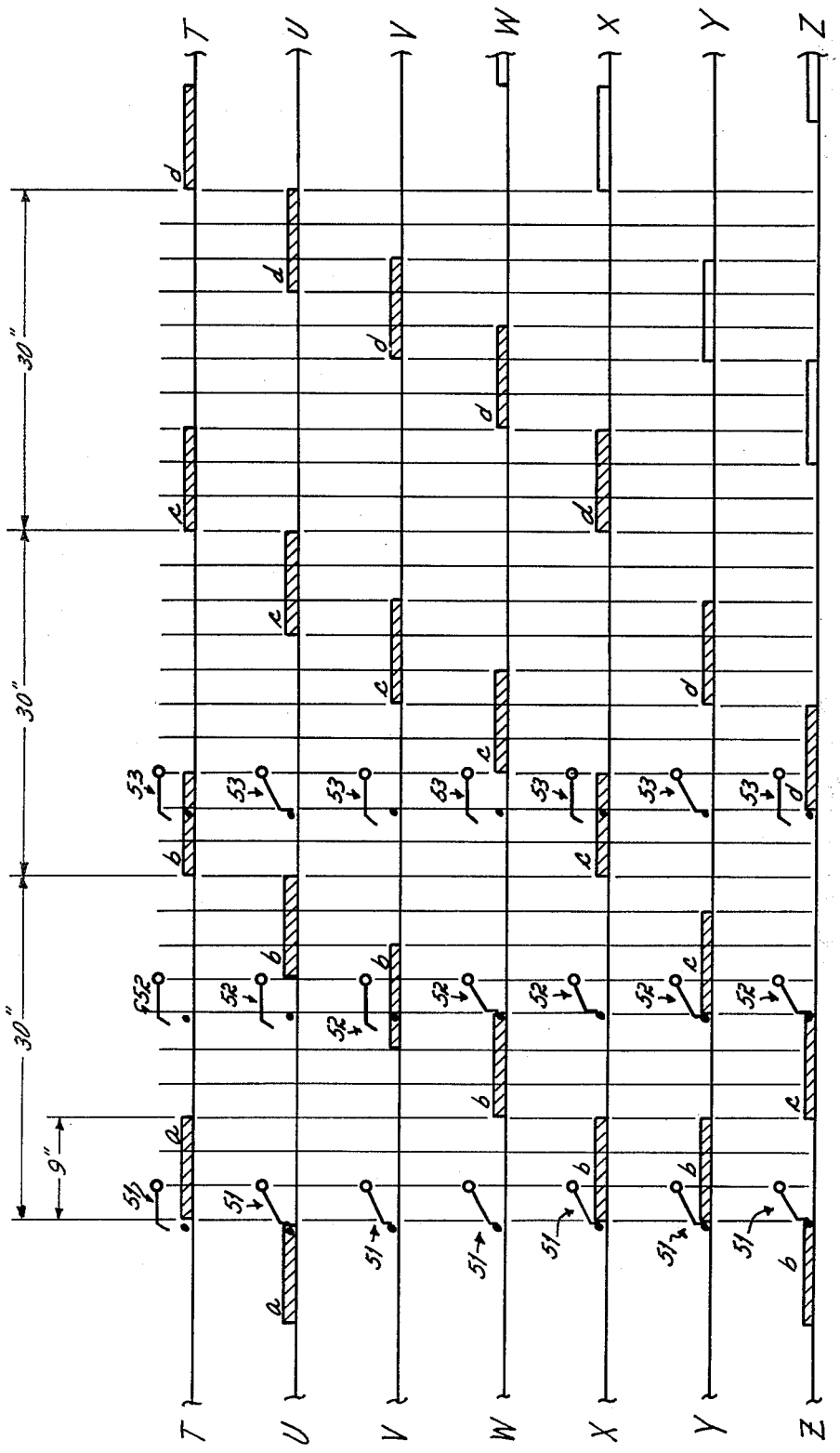
FIG. 6 is a diagrammatic view of the sequence of movement of tubes through respective gates.

The manner in which the gates sequence the tubes through the primary gate and onto the drum is illustrated in FIG. 6. There, as indicated at line T, three tubes a, b, and c are shown in a transistory condition with the desired 30 inches spacing, the gates being spaced apart 18 inches, and the tubes are 9 inches long. Tube a has just started through the primary gate 51 and blanks the electric eye 71 causing the secondary gate 52 to open. A tube b is passing through the third gate 53 and a third tube c is approaching the third gate. In the next sequence at U, tube a has passed the primary gate 51 causing it immediately to close. Tube b has passed the third gate 53 causing it immediately to close. The secondary gate 52 remains open and will not be closed until tube b passes it. In the sequence V, tube b has passed partially through the secondary gate 52 thereby blanking the electric eye 72 there. The blanking of that electric eye 72 has caused the third gate 53 to swing open ready to admit the tube c.

In the sequence W, tube b has passed the secondary gate 52 causing that gate to close. Tube c continues to approach the third gate 53.

At the X sequence, let it be assumed that the unsafe portion of the drum has moved to the discharge area of the tube. Therefore, the primary gate 51 remains closed and will remain closed for as much of the cycle as is required to permit the drum to continue to rotate until the safe area appears at the discharge position. As shown, the b tube is held at the primary gate 51 for approximately 150° and in sequence Y the c tube is prevented by the secondary gate 52 from passing to the primary 51 until the b tube has been released. When the b tube is released, the blanking out of the electric eye 71 at the primary gate 51 permits the c tube to be released at gate 52. Thus, the primary gate permits a tube to be discharged onto the drum only when it is safe to do so and, hence, the electric eye 71 of the primary gate 51 controls the secondary gate 52, only one tube, in this case the b tube, passing onto the drum during any one cycle.

The gate control system admits of some modification. For example, the electric eye 71 associated with the primary gate 51 might be located immediately upstream of the gate so as to provide an additional control on the opening of the gate. In the embodiment as described above, the primary gate was automatically opened when the safe area was under the discharge point for the tube. With the modified positioning of the electric eye, the gate would be conditioned to open when the safe area is under the discharge point of the tube but would not open unless the tube actually appeared to blank out the electric eye. When the electric eye was unblanked by the passing of the tube, the primary gate would immediately shut down and the secondary gate would open.

While the invention has been described and claimed with particular reference to the transfer of tubes, it should be understood that the invention is also applicable to the handling of other elongated objects which are either cylindrical or bar-like.

Having described our invention, we claim:

1. Mechanism for transferring elongated objects such as tubes from a tube filler to the product bucket of a cartoner comprising,
    an endless conveyor for carrying tubes lengthwise, normally in spaced apart relation to said cartoner,
    a drum at the discharge end of said conveyor overlying said product buckets, said drum having an axis perpendicular to the direction of movement of said product buckets,
    said drum having a substantially cylindrical surface,
    at least one pocket in the surface of said drum,
    means connecting said drum to said cartoner to drive said drum continuously in timed relation to said cartoner,
    means for feeding tubes lengthwise from said conveyor onto the cylindrical upper portion of the drum surface and spaced from said pocket,
    gate means along said conveyor permitting the feeding of each tube to the feeding means so that the tube will only arrive on said cylindrical surface of said drum,
    detaining means associated with said drum to maintain a tube on the upper portion of the cylindrical surface of said drum until the arrival of a pocket under said tube to receive the tube.

2. A mechanism as in claim 1, said determining means comprising,
    a shroud surrounding and slightly spaced from a portion of the circumferential surface of said drum,
    said shroud having a radially outwardly-projecting surface against which said tubes rest until said pocket passes underneath.

3. A mechanism as in claim 2 in which said projecting surface is located about 30° from a vertical position.

4. A mechanism as in claim 1, said tube feeding means comprising,
    a diverter gate overlying said conveyor adjacent said drum,
    said diverter gate normally being angulated across said conveyor to cam tubes off said conveyor and onto said drum.

5. A mechanism as in claim 4 further comprising,
    means for swinging said diverter gate out of the path of said tubes to permit tubes to pass beyond said drum for different processing.

6. A mechanism as in claim 2 in which the depth of a pocket in said drum is approximately one-half a diameter of a tube, and in which said shroud is spaced radially from said drum approximately one-half a diameter of a tube.

7. A mechanism as in claim 1 in which said pocket is substantially enlarged at one end to receive the clip end of a tube and to space the projecting surface of the tube uniformly from the circumferential surface of said drum.

8. A mechanism as in claim 1 in which said pocket has a leading gradually-sloped surface and a more abrupt trailing surface to facilitate ease of entry of said tube into said pocket.

9. A mechanism as in claim 1 in which the circumferential drum speed is substantially greater than the lineal speed of the product buckets.

10. A mechanism for transferring tubes from a tube filler to the continuously-moving product buckets of a cartoner comprising,
    a conveyor means for conveying tubes lengthwise and in spaced apart relation from said tube filler to said product buckets,
    a rotary drum drivably connected to said cartoner, said drum having a substantially cylindrical surface, and having at least one pocket in its cylindrical surface,
    said drum being located adjacent to the discharge end of said conveyor means and overlying said product buckets,
    a shroud surrounding and spaced from a portion of the cylindrical surface of the drum,
    and a primary gate at the discharge end of said conveyor, means controlling said primary gate to permit the release of each tube from said conveyor means onto said drum only when said cylindrical surface is present at the discharge end of the conveyor means so that the tube will fall on said cylindrical surface of said drum.

11. A mechanism as in claim 10 further comprising,
    an electric eye adjacent said gate and control means associated with said eye to prevent closing said gate while a tube is passing through said gate.

12. A mechanism as in claim 10 further comprising,
    a second gate located in the path of tubes on said conveyor means and spaced upstream of said primary gate,
    an electric eye adjacent said primary gate,
    and control means for opening said second gate immediately after a tube has passed said primary gate.

13. A mechanism as in claim 12 in which said control means effects the closing of the second gate immediately after the tube has passed the second gate.

14. A mechanism as in claim 10 further comprising,
    a cam switch drivably connected to said drum and electrically connected to said primary gate to close said gate when a tube could be damaged by being released to said drum,
    and to open said gate during a period of the rotation of said drum when a tube may safely be deposited on said drum surface,
    and an electric eye and circuit associated with said gate to close said gate immediately after a tube has passed said gate, and to keep said gate closed until said "safe" portion of said drum reopens at the next cycle of said drum.

15. A mechanism as in claim 14 further comprising,
    a second gate on said conveyor means and spaced upstream of said primary gate,
    a second electric eye downstream of said second gate,
    circuit means for closing said second gate immediately after a tube has passed said second electric eye, and for opening said second gate after a tube has passed said first electric eye.

16. A mechanism as in claim 15 further comprising,
    a third gate on said conveyor means and spaced upstream of said second gate,
    a third electric eye downstream of said third gate,
    circuit means for closing said third gate immediately after a tube has passed said third electric eye and for opening said third gate after a tube has passed said first electric eye.

* * * * *

UNITED STATES PATENT AND TRADEMARK OFFICE
CERTIFICATE OF CORRECTION

PATENT NO. : 4,261,456
DATED : April 14, 1981
INVENTOR(S) : Eric W. Scarpa and Wesley J. Rece It is certified that error appears in the above—identified patent and that said Letters Patent is hereby corrected as shown below:

Column 7, line 34 (Claim 2), "determining" should be

-- detaining --

Signed and Sealed this

Fourth Day of August 1981

[SEAL]

*Attest:*

*Attesting Officer*

GERALD J. MOSSINGHOFF

*Commissioner of Patents and Trademarks*